Nov. 3, 1925.
S. M. FAIRCHILD ET AL
1,559,688
APPARATUS FOR PHOTOGRAPHIC CARTOGRAPHY
Filed March 1, 1923    3 Sheets-Sheet 2
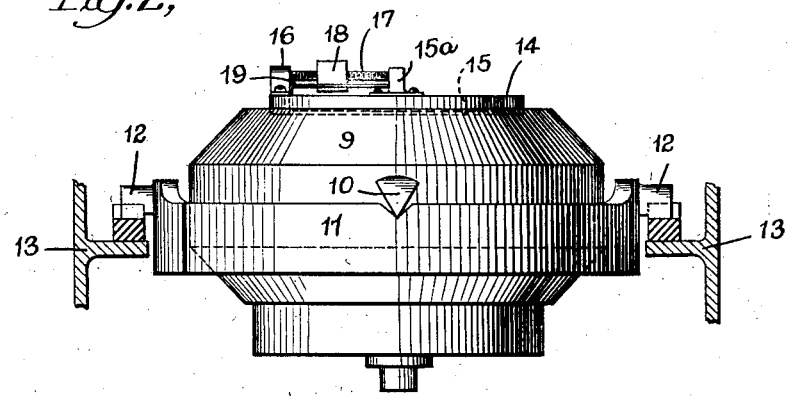
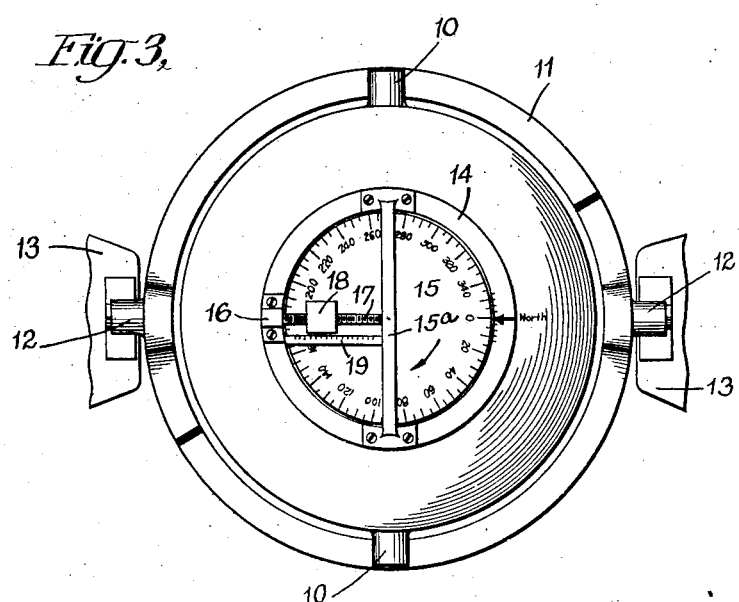
S. M. Fairchild
E. R. Morton
Inventors
By their Attorneys
Cooper, Kerr & Dunham

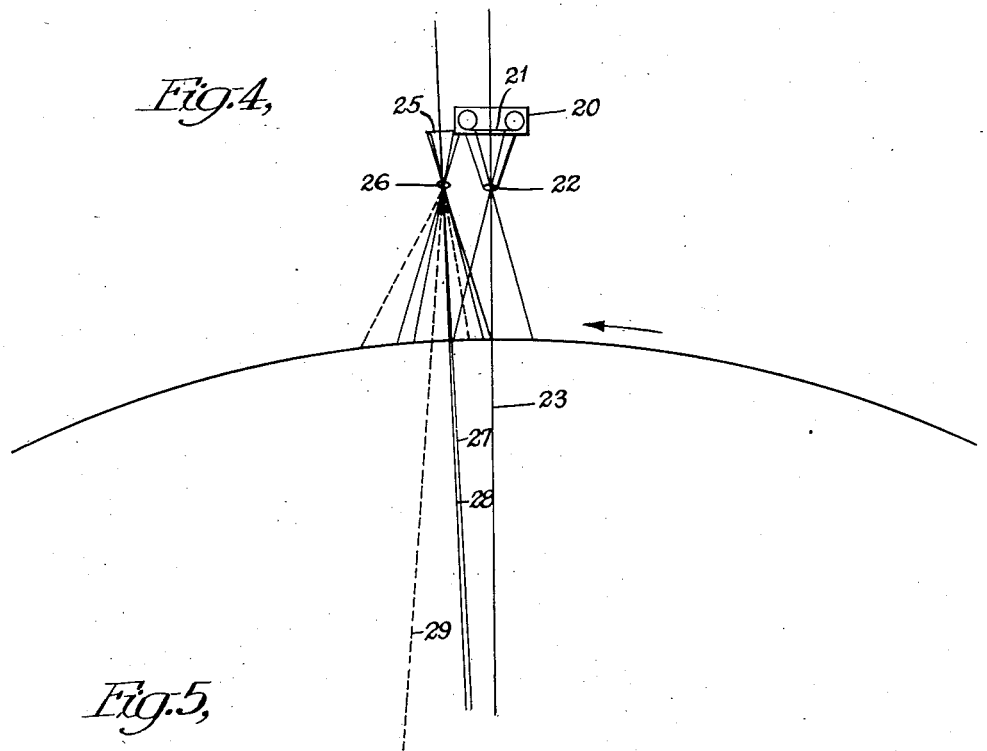
Fig.4,
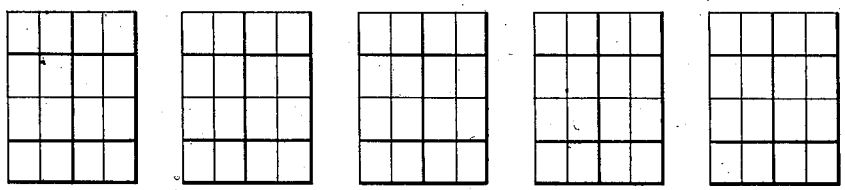
Fig.5,
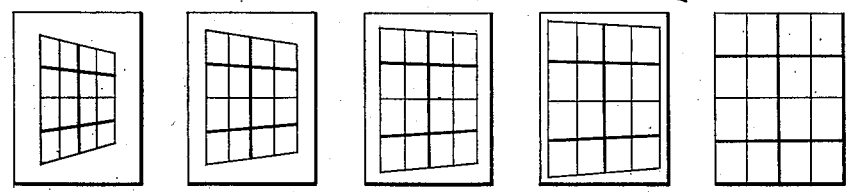
Fig.6,

Patented Nov. 3, 1925.

1,559,688

UNITED STATES PATENT OFFICE.

SHERMAN M. FAIRCHILD AND EDMUND R. MORTON, OF NEW YORK, N. Y.; SAID MORTON ASSIGNOR TO SAID FAIRCHILD.

APPARATUS FOR PHOTOGRAPHIC CARTOGRAPHY.

Application filed March 1, 1923. Serial No. 622,039.

*To all whom it may concern:*

Be it known that we, SHERMAN M. FAIRCHILD and EDMUND R. MORTON, both citizens of the United States of America, and residents of New York, county and State of New York, have invented certain new and useful Improvements in Apparatus for Photographic Cartography, of which the following is a full, clear, and exact description.

The primary object of our present invention is to provide a simple, reliable and effective apparatus for fixing the relative location of points or objects on the earth's surface, the distances between such points or objects, and in some cases the difference in elevation thereof, by means of a series of photographs taken at successive points along the path of travel of an aeroplane by a camera mounted on the latter.

In carrying out our invention we provide means for so supporting the camera on the aeroplane that the external optical axis of the camera with which the photograph is recorded is held radial to the earth continuously or at the instants at which the successive pictures are taken. We specify the external optical axis, as the camera may be built with prisms or mirrors which change the position of the optical axis internally without affecting the external or effective optical axis.

In the practical carrying out of our invention we have connected the camera to the aeroplane by means permitting an adjustment of the camera with respect to the aeroplane about two horizontal axes at right angles to each other and have provided gyroscopic means for holding the camera with its external axis of projection radial to the earth or substantially so while the camera is in use. With the camera thus mounted, we take a series of pictures from points sufficiently close together along the path of travel of the aeroplane that the pictures overlap and we utilize the points shown in the overlapping portions of successive pictures to fit the successively taken pictures together with the overlapping portions in register, determining the difference in scale between any two successively taken pictures by the apparent difference in the distances on the pictures between a pair of points shown in common on the two pictures, in case variations in elevation of the aeroplane at the instants at which the two pictures are taken make this scale determination necessary or desirable. With the various pictures brought to the same known scale it becomes a simple matter to make a scale map of the territory shown by the pictures. The scale to which the pictures are brought may be determined either approximately by instruments showing the elevation of the aeroplane at the time of taking any one picture in the series or more precisely from the pictures themselves in comparison with a predetermined base line in the initial picture or a triangulated network. Differences in elevation of various points shown simultaneously in two or more pictures may be readily determined by parallax, when such determination is necessary, provided the scale of any one picture is known.

It will be noted by those skilled in the art that many different kinds of camera mechanism may be employed in utilizing our invention in its broader aspects. In general, however, we prefer to employ an electrically driven automatic camera having provision for making exposures at the will of the operator or by an external timing device so that the proper overlap of successively taken pictures may be secured, making due allowance for aeroplane ground speed and elevation and for the nature of the terrain photographed.

The necessity of this last qualification will be understood if the variation in scale and parallax due to changing elevation of the ground is considered with respect to the requirement of uniform scale for laying down a "mosaic" or map assembled from a series of photographs. It is clear that if the ground elevation is changing the scale and parallax of the photographs are also changing, and the horizontal errors in the finished map must be made small by utilizing a large number of separately corrected prints.

For a better understanding of the invention, and of the advantages possessed by it, reference may be had to the accompanying drawings and description, in which we have illustrated by way of example preferred forms of apparatus devised by us and preferred modes of utilizing the same.

In the drawings,

Figs. 2 and 3 show one form of gyroscope designed and constructed to precess in a predetermined manner, as will be described hereinafter;

Figs. 4, 5 and 6 show diagrammatically the method and results of mapping with our method and with other gyroscopically controlled cameras.

Figure 1:
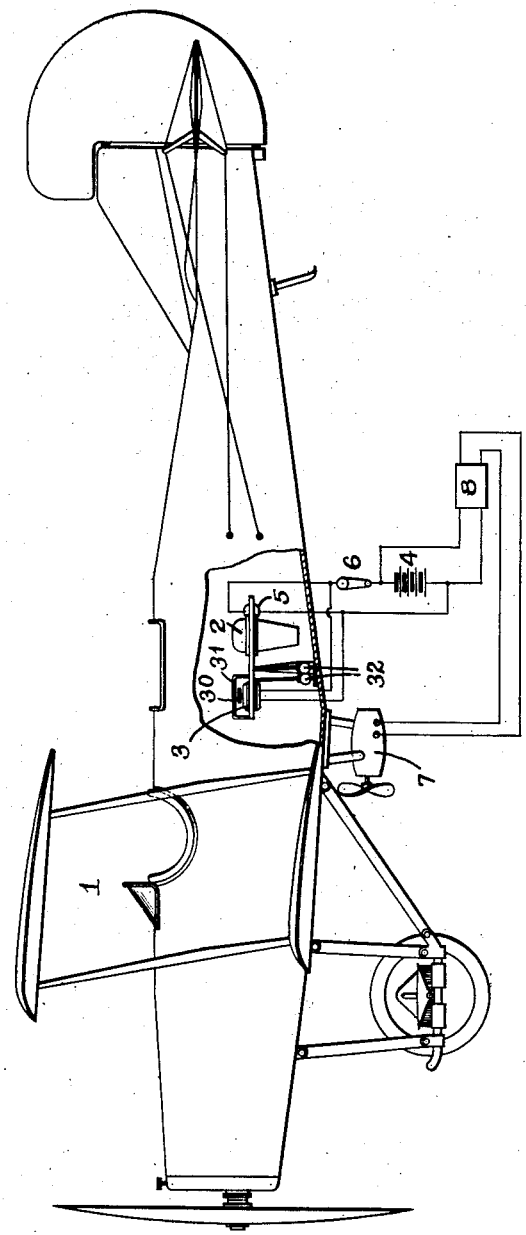
Fig. 1 shows an aeroplane with our device in the preferred form mounted therein.

In the preferred form of apparatus, in Fig. 1, an aeroplane 1 is partly broken away to show the camera 2, controlled by a precessing or self-erecting gyroscope 3, as will be described later. A storage battery 4, diagrammatically represented, supplies power to the camera driving motor 5 and gyroscope 3 through a switch 6. A wind-driven generator 7 may be used if desired on long flights to recharge the battery 4 through a charging relay 8 of the type well known for this purpose. Preferably the camera 2 is of the type described in the copending application of Sherman M. Fairchild, Serial No. 622,032, filed March 1, 1923.

A gyroscope when neutrally mounted will tend to maintain the direction of its axis in space, but may be caused to change the direction of its axis at a definite rate of speed by the application of an external force in a direction at right angles to the direction of the desired change, the rate of speed of the change in position of the axis of the gyroscope being dependent upon the speed and moment of inertia of the gyroscope, and upon the magnitude of the force applied.

To cause the gyroscope to precess in the proper manner for our purpose we prefer to place on the gyroscope and in line with a meridian of the earth a weight of computed magnitude at a distance (from the axis of the gyroscope) dependent on the mass of the weight and the latitude of the locality on the earth's surface, so that the gyroscope is caused to precess in an easterly direction about the center and axis of the earth with a velocity equal to the speed of rotation of the earth corrected for the velocity and direction of the aeroplane; this speed being 15 minutes of arc multiplied by the cosine of the latitude for each minute of time, neglecting the velocity of the aeroplane.

In the gyroscopic device illustrated in elevation in Fig. 2 and in plan in Fig. 3 a casing 9 carrying a rotor and driving motor (not shown) is carried by knife edges 10 in the gimbal frame 11 which is in turn carried by knife edges 12 on supports 13 which may be suitably supported by the aeroplane. A ring 14 is mounted on the gyroscope and is adapted to be rotated with respect to the dummy compass card 15 according to its orientation with respect to the earth. The ring 14 carries on brackets 15 and 16 a threaded rod 17 on which is a weight 18, adjustable (for latitude) relatively to scale 19.

The gyroscopic device is designed to be strictly in neutral equilibrium when the weight 18 is at its zero position with respect to scale 19.

The operation is as follows: Before the flight, the gyroscope is brought up to speed, weight 18 is adjusted according to the latitude, and the gyroscope is leveled by applying external forces. If now the ring 14 is rotated according to the corrected compass bearing to bring the unbalance due to weight 18 to a north or south position with respect to the axis of the gyroscope, the gyroscope will continually precess eastward about the earth's center at a rate equal to that of the rotation of the earth.

For certain kinds of work a supplementary correction may be made in the angular setting of ring 14 to compensate for the rate of travel of the aeroplane north or south; and a correction may also be made in the position of weight 18 so as to change the rate of precession of the gyroscope, for the purpose of correcting the rate of travel of the aeroplane east or west, but ordinarily this will be unnecessary because of the small areas surveyed on one flight. Thus a twenty-mile strip introduces maximum error of this sort of about ⅓ degree, which is reduced to zero on the return flight.

Since it is not permissible in this method to apply any disturbing force to the gyroscope, we prefer to control the camera by means of the apparatus described in our copending application Serial No. 622,036, filed March 1, 1923, or by one or another of the various well known devices for the purpose in the art, as for example those described in prior United States patents of Tower, No. 366,438, issued July 12, 1887, and Bliss, No. 795,045, issued July 18, 1905, of which it is deemed sufficient to say that a transmitting element 30 and a receiving element 31 diagrammatically illustrated, form a positionally responsive device for controlling the motors 32 to cause them to operate to maintain the external optical axis of the camera in parallelism with the axis of the gyroscope.

As a substitute we may use the gyroscope of J. and J. G. Gray, described in their United States Patent No. 1,311,768. It will be noted that this device is, strictly speaking, not a gyroscopically stabilized pendulum but a neutrally mounted gyroscope and adapted to be made to precess through given amounts in determined direction as desired. We may also use a combination of this device with the gyroscope described above, to relieve the erecting device of the aforesaid United States Patent No. 1,311,768 of doing the work necessary to cause the gyroscope to precess at the desired rate, thus permitting the erecting device of the last mentioned United States patent to be made small enough to do only the work for which it should be used, that of applying corrections to the secondary and mechanical errors of the gyroscope.

Previous users of the gyroscope for camera stabilization have preferred to maintain the camera in a fixed position in space. This gives a distorted view of the terrain, dependent on the deviation of the camera axis from the earth's radius through it, this deviation itself being dependent upon the time elapsed after the start of the gyroscope. By means of one of the gyroscopic devices described we are able to keep the camera axis continuously radial to the earth, a thing impossible of attainment by hanging the camera pendulously or by a gyroscopically damped pendulum, either of which means is subject to errors due to erratic motions of the aeroplane carrying it. We do not, however, exclude these devices from our invention, as for many purposes they may give an approximation sufficiently accurate.

Having obtained a series of overlapping photographs showing a series of conical projections which in their main features represent a true radial projection of the earth's sphere we may determine by means well known to the art a map, on radial projection, of the photographed portion of the earth's surface.

Referring to Fig. 4, a camera diagrammatically represented with focal plane 21 and lens 22, determining the optical axis 23, is shown in the position at the start of a survey and the focal plane 25 and the lens 26 represent the position of the camera at a subsequent time, at which time the optical axis will have reached the position indicated, say, by the line 27 if the precessing weight or force were adjusted to correct the precession of the gyroscope for the travel of the aeroplane; or the position indicated by the line 28 if such secondary correction were not made. On the other hand, if the gyroscope maintained its axis in constant parallelism with its successive positions the axis of the camera, when the latter has reached the position 25—26, will be in a position represented by the broken line 29, by reason of the rotation of the earth; this rotation being, as before stated, at the rate of ¼° arc per minute of time, multiplied by the cosine of the terrestrial latitude. Under ordinary conditions when our invention is employed the deviation of the camera axis between the beginning and end of a twenty-mile strip will be negligible, especially if the secondary correction be made for the eastward or westward component of the aeroplane's travel. If such correction be not made the deviation may be about ⅓°. Under similar conditions, but with a gyroscope which maintains the camera axis in constant parallelism, the deviation would be, at latitude 40° for example, about 3°. A deviation of such magnitude would necessitate subsequent rectification in preparing the map or photographic mosaic. This will be evident by reference to Figs. 5 and 6. The former of these figures represents diagrammatically, by means of a grid or mesh system, a series of five successive photographs taken by means of our invention, while Fig. 6 shows, with some exaggeration, the distortion which would be found in a similar series of photographs of the same territory taken with a camera whose optical axis is maintained in constant parallelism. Likewise, if a return strip of the same length is flown, the small deviation error present when the camera axis is at the line 28, Fig. 4, is reduced to zero; whereas in the return flight with a camera taking pictures distorted as in Fig. 6 the deviation error, requiring subsequent rectification, is doubled, becoming, in the example given, 6° instead of the original 3°, and therefore necessitating extensive rectification in the subsequent operation of preparing a map or mosaic print. On the other hand pictures made with our invention, embracing areas ordinarily covered by a single survey, may be laid out on a plane surface with sufficient accuracy for all practical purposes.

From the foregoing it will be observed that with our invention the earth's surface may be mapped by double projection, in which points lying on the optical axis of the camera are radially projected (from the earth) on the plane of the photograph, and other points shown in the photographs are conically projected upon the same plane in such manner that irregularities of the earth's surface may be determined by computing the parallax of points shown in common on a pair of successive photographs.

While in accordance with the provisions of the statutes we have illustrated the best embodiments and modes of carrying out our invention now known to us, it will be understood by those skilled in the art that many modifications may be made in the form of the apparatus and the modes of operation disclosed, without departing from the spirit of our invention and that certain features of our invention may sometimes be used with advantage without a corresponding use of other features.

We consider our invention of particular utility for use in connection with what is known as an aeroplane in distinction from other aircraft, but it is to be understood that the invention can be used in connection with dirigible balloons, moving captive balloons, or other craft which travel through the air, and by the use of the term "aeroplane" in the claims we do not intend to exclude other forms of aircraft. The method or process described in this specification is not claimed herein but is claimed in our copending application Serial No. 622,038, filed March 1, 1923.

Having now described our invention, what we claim as new and desire to secure by Letters Patent is:

1. In combination with an aeroplane, a camera mounted with freedom for adjustment on said aeroplane, a gyroscope for positioning the camera, and means for causing the gyroscope to precess continually in substantial coincidence with a radious of the earth.

2. In combination with an aeroplane, a camera mounted with freedom for adjustment on said aeroplane, a gyroscope, means for causing said gyroscope to precess with its axis continually coincident with a radius of the earth, and means for causing the camera to be maintained with its optical axis substantially in parallelism with the axis of the gyroscope.

3. In combination with an aeroplane, a neutrally mounted gyroscope carried thereby, means for causing the gyroscope to precess in a predetermined manner, a camera, and means for causing the camera to be maintained with its optical axis substantially in parallelism with the axis of the gyroscope.

4. In combination with an aeroplane, a camera and gyroscope carried thereby, said gyroscope having a predetermined unbalance about a horizontal axis, erecting means for said gyroscope, and means for causing said camera to be maintained with its axis substantially in parallelism with the axis of the gyroscope.

In testimony whereof we hereto affix our signatures.

SHERMAN M. FAIRCHILD.
EDMUND R. MORTON.